United States Patent [19]
Aota et al.

[11] Patent Number: 5,931,737
[45] Date of Patent: Aug. 3, 1999

[54] ELASTIC SHAFT COUPLING

[75] Inventors: Kenichi Aota, Nara-ken; Junya Watanabe, Yao, both of Japan

[73] Assignee: Koyo Seiko Co., Ltd., Japan

[21] Appl. No.: 08/918,198

[22] Filed: Aug. 25, 1997

[30] Foreign Application Priority Data

Sep. 11, 1996 [JP] Japan ..................................... 8-262382

[51] Int. Cl.$^6$ .................................................. F16D 3/76
[52] U.S. Cl. ............................................. 464/89; 464/162
[58] Field of Search .......................... 464/89, 112, 134, 464/160, 162, 180, 905; 74/492

[56] References Cited

U.S. PATENT DOCUMENTS

| | | | |
|---|---|---|---|
| 3,878,695 | 4/1975 | Pitner ......................................... | 464/89 |
| 4,183,258 | 1/1980 | Stephan ...................................... | 74/492 |
| 4,385,897 | 5/1983 | Mallet ........................................ | 464/89 |
| 4,479,786 | 10/1984 | De Bisschop .............................. | 464/89 |
| 4,509,775 | 4/1985 | Arndt .......................................... | 74/495 |
| 4,551,115 | 11/1985 | Ferguson . | |
| 4,983,143 | 1/1991 | Sekine et al. .............................. | 464/89 |
| 5,086,661 | 2/1992 | Hancock ..................................... | 464/89 |
| 5,259,818 | 11/1993 | Kachi et al. ............................... | 464/89 |
| 5,785,600 | 7/1998 | Castellon ................................... | 464/89 |
| 5,827,122 | 10/1998 | Kurian ........................................ | 464/162 |

FOREIGN PATENT DOCUMENTS

| | | | |
|---|---|---|---|
| 0392858 | 10/1990 | European Pat. Off. . | |
| 2544816 | 10/1984 | France ....................................... | 464/89 |
| 2637334 | 4/1990 | France ....................................... | 464/89 |
| 3-168415 | 7/1991 | Japan ......................................... | 464/89 |
| 5-89964 | 12/1993 | Japan . | |
| 7-43494 | 10/1995 | Japan . | |
| 1405541 | 9/1975 | United Kingdom . | |
| 2019529 | 10/1979 | United Kingdom . | |
| 2057632 | 4/1981 | United Kingdom ....................... | 464/89 |
| 2070737 | 9/1981 | United Kingdom ....................... | 464/89 |

*Primary Examiner*—Eileen Dunn Lillis
*Attorney, Agent, or Firm*—Adams & Wilks

[57] ABSTRACT

An elastic shaft coupling comprises a tubular housing having a first inner peripheral surface portion and a second inner peripheral surface portion, a shaft member extending into the tubular housing, an elastic member disposed between the tubular housing and the shaft member, and a displacement preventing portion for preventing excessive relative rotational displacement between the tubular housing and the shaft member. The shaft member has a terminal end disposed in the tubular housing, a first outer peripheral surface portion, and a second outer peripheral surface portion disposed at the terminal end. The elastic member is connected to the first inner peripheral surface portion of the tubular housing and the first outer peripheral surface portion of the shaft member. The displacement preventing portion is disposed between the second inner peripheral surface portion of the tubular housing and the second outer peripheral surface portion of the shaft member.

29 Claims, 2 Drawing Sheets

ELASTIC SHAFT COUPLING

FIELD OF THE INVENTION

The present invention relates to an elastic shaft coupling used for a handle joint of an automobile or the like.

DESCRIPTION OF THE RELATED ART

A conventional elastic shaft coupling used for a handle joint of an automobile or the like has been known from Japanese Utility Model Publication No. 7 (1995)-43494 issued on Oct. 9, 1995. This elastic shaft coupling comprises a yoke having a fitting hole for a cross shaft in an arm portion on one side and an axial fixedly fitting hole in a base portion on the other side; a tubular member having an external peripheral portion fitted in the fixedly fitting hole of the yoke and in which a shaft member is axially movably fitted in an inner peripheral portion; an elastic member intervened between the fixedly fitting hole of the end of the base portion of the yoke and the tubular member and secured to the fixedly fitting hole and the tubular member; and a stopper provided between the yoke and the tubular member to prevent an excessive rotational relative displacement.

In the above elastic shaft coupling, the end of the base portion, the elastic member and the tubular member are formed with diametrically communicating through-holes. A pin member is inserted into the through-hole and secured to the through-hole of the tubular member. A circumferential predetermined clearance is provided between the pin member and the base portion of the yoke to allow a predetermined rotational relative displacement of the yoke and the tubular member. The pin member constitutes a stopper portion for preventing the excessive relative displacement of the yoke and the tubular member.

The function of the elastic shaft coupling, which is used for a handle joint, will be explained hereinafter.

The elastic member is provided so as not to transmit vibrations of an automobile to a steering wheel. At the time of small torque transmission such as steering during the running of an automobile, the torque transmission between the tubular member and the yoke is effected by the elastic force of the elastic member. Further, at the time of large torque transmission such as steering during the stopping of an automobile, the elastic member becomes elastically deformed so that the pin member rotates around the diametrically central part into contact with the yoke, constituting a stopper portion. From this time, engagement between the pin member and the yoke causes the torque transmission between the tubular member and the yoke. The function of the elastic shaft coupling has been heretofore well known.

A further conventional elastic shaft coupling has been known from Japanese Utility Model Application Laid-Open No. 5 (1993)-89964 issued on Dec. 7, 1993. This elastic shaft coupling comprises a yoke having a fitting hole for a cross shaft in an arm portion on one end side and an axial fixedly fitting hole in a base portion on the other end side; a shaft member fitted in the fixedly fitting hole of the yoke; an elastic member intervened between the fixedly fitting hole of the end of the base portion of the yoke and the shaft member and secured to the fixedly fitting hole and the shaft member; and a stopper portion provided between the yoke and the tubular member to prevent an excessive rotational relative displacement of both members.

In the above elastic shaft coupling, a diametrical notch portion as a stopper portion is formed in a position opposed through 180 degrees of an internal peripheral surface of the fixedly fitting hole of a connecting portion of the arm portion of the base portion of the yoke, and a stopper plate in engagement with the notch portion is secured to a shaft end portion. The function of the elastic shaft coupling which is used for example, for a handle joint of an automobile is similar to the aforementioned prior art, explanation of which is therefore omitted.

However, in the former elastic shaft coupling described above, after the elastic member has been pressed in and secured to the yoke and the tubular member, the diametrical through-hole through which the pin member is inserted is processed. This poses a problem that the elastic member is cut so that the durability is insufficient.

Further, the number of assembling steps is large and the number of parts is large, posing a problem that the cost is high.

Further, in the case where the elastic shaft coupling is used for example, for a handle joint of an automobile, a steering shaft is axially movably fitted in the tubular member. In the case where a shock absorbing mechanism is employed for the steering shaft, when an automobile collides, the steering shaft slidably moves within the yoke to contract the full length. Therefore, the steering shaft interferes with the pin member, posing a problem in that a large moving stroke of the steering shaft is not taken and a sufficient shock absorbing function is hard to provide.

In the latter elastic shaft coupling, it is designed so that a diametrical notch portion as a stopper portion is formed in a position opposed through 180 degrees of the fixedly fitting hole of the connecting portion of the arm portion of the base portion of the yoke, posing a problem that the strength of the base portion of the york possibly lowers.

SUMMARY OF THE INVENTION

It is an object of the present invention to provide an elastic shaft coupling which is intended to enhance the strength of the coupling and reduce the cost, and which can be used, in the case where for example, it is used as a handle joint of an automobile, irrespective of the presence or absence of a shock absorbing mechanism of a steering shaft connected to an elastic shaft coupling.

According to one embodiment, an elastic shaft coupling of the present invention comprises a yoke having a fitting hole for a cross shaft in an arm portion on one end side and an axially extending-through fixedly fitting hole in a base portion on the other end side; a tubular member in which an external peripheral portion is fitted in the fixedly fitting hole of the yoke and a shaft member is axially movably fitted in an internal peripheral portion; an elastic member intervened between the fixedly fitting hole of the end of the base portion of the yoke and the tubular member and secured to the fixedly fitting hole and the tubular member; a pair of first parallel surfaces formed so as to axially extend positions opposed through 180 degrees of an internal peripheral surface of the fixedly fitting hole on the arm portion side of the base of the yoke; a pair of second parallel surfaces formed so as to axially extend positions opposed through 180 degrees of an outer peripheral surface of the end of the tubular member and to be parallel to said first parallel surfaces; and a stopper portion provided between the yoke and the tubular member to prevent an excessive rotational relative displacement of both the members, said yoke and said tubular member being fitted with the first parallel surfaces of the base portion of the yoke and the second parallel surfaces of the tubular member, said first and second parallel surfaces constituting a stopper portion.

In a further embodiment, in place of the tubular member, a shaft member is directly fitted in the fixedly fitting hole.

In the elastic shaft coupling according to the present invention, since the elastic member and the stopper portion are provided separately in axially parallel positions, it is unnecessary to apply processing to the elastic member. Accordingly, the durability of the elastic member is enhanced. Further, since the pair of parallel surfaces are formed in the internal peripheral surface of the fixedly fitting hole of the base portion of the yoke to apply them to the stopper portion, a notched groove for a stopper is not particularly formed in the base portion of the yoke, thus enhancing the strength of the coupling.

DETAILED DESCRIPTION OF THE PREFERRED EMBODIMENTS

Figure 1:
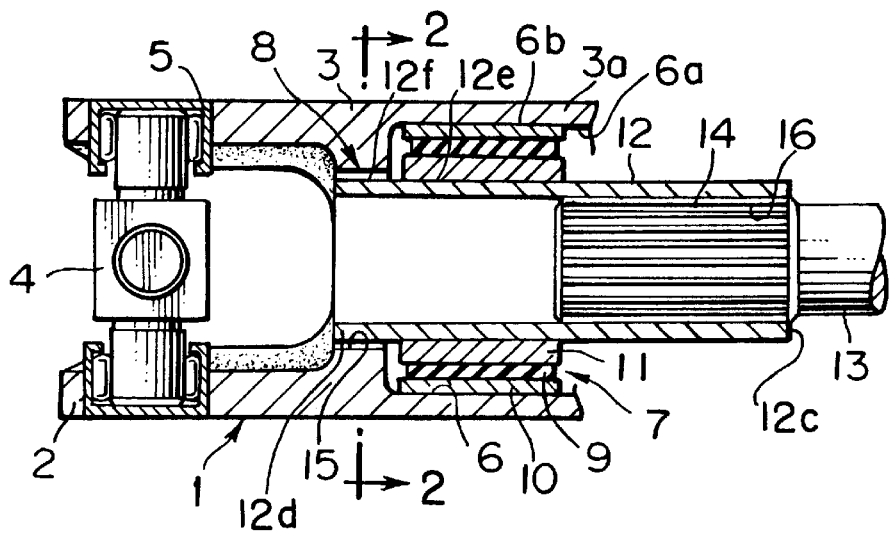
FIG 1 is a sectional view of a first embodiment of an elastic shaft coupling according to the present invention.

The present invention will now be explained by way of embodiments with reference to the drawings.

A first embodiment in which an elastic shaft coupling according to the present invention is used as a handle joint of an automobile will be explained with reference to FIGS. 1 and 2. On one end side of a yoke 1, a first bore fitting hole 5 for a cross shaft 4 is provided in a generally U-shaped yoke portion or fork-like arm portion 2, and a second bore or axial fixedly fitting hole 6 is provided in a tubular housing or base portion 3 on the other end side. The fixedly fitting hole 6 has a fixedly fitting hole portion 6a having a first diameter, and a fixedly fitting hole 15 having a second diameter smaller than the first diameter. A tubular member 12 has an open end 12c, a terminal end 12d, a first peripheral surface portion 12e and a second peripheral surface portion 12f and is fitted in the fixedly fitting hole 6 of the yoke 1. An elastic member 7 secured to the fixedly fitting hole portion 6a of the fixedly fitting hole 6 at an end 3a of the base portion 3 and the tubular member 12 is intervened between an inner surface of fixedly fitting hole 6a, yoke 1 and the tubular member 12. In a lateral parallel position with the elastic member 7 and between an inner peripheral surface of the fixedly fitting hole 15 on the side of the arm portion 2 of the yoke 1 and an outer peripheral surface of the tubular member 12 is provided a stopper portion 8 as displacement preventive means for preventing an excessive rotational relative displacement of both members 1 and 12.

The elastic member 7 is formed from a cylindrical rubber damper 9. Metal sleeves 10 and 11 are integrally baked on an external peripheral surface and an internal peripheral surface of the elastic member 7. The internal and external sleeves 10 and 11 are pressed and fitted in the internal peripheral surface of the fixedly fitting hole portion 6a provided in the end 3a of the base portion of the yoke 1 and the external peripheral surface of the tubular member 12. It is noted that instead of baking the sleeves 10 and 11 to the elastic member 7, the external peripheral surface and the internal peripheral surface of the rubber damper 9 may be directly baked to the internal peripheral surface of the fixedly fitting hole portion 6a provided in the end 3a of the base portion of the yoke 1 and the external peripheral surface of the tubular member 12.

The internal peripheral surface of the tubular member 12 is circular. A spline 16 is formed in an internal peripheral surface of one end on the counter-yoke side of the tubular member 12 and fitted with a spline 14 of a steering shaft 13 either of the steering side or the handle side. The steering shaft 13 is provided with a shock absorbing mechanism (not shown). A so-called collapse mechanism is provided. The fitting of the steering shaft 13 into the tubular portion 12 is arranged so that the former can slide within the tubular member 12. This is because of the fact that when the automobiles collides, the steering shaft 13 absorbs the shock to contract the full length in an axial direction.

Figure 2:
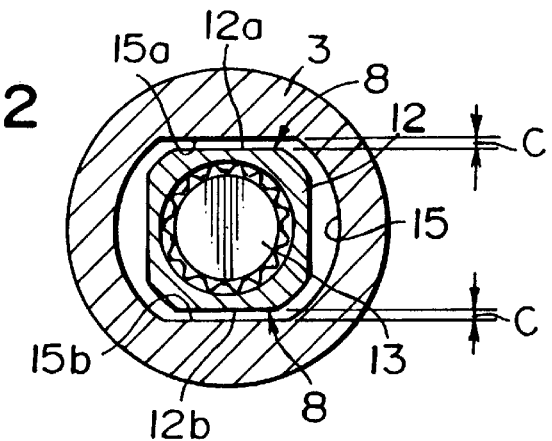
FIG. 2 is a sectional view taken on 2—2 of FIG. 1.

A pair of axially extending first parallel surfaces 15a, 15b are formed, in positions opposed through 180 degrees, in the internal peripheral surface of a fixedly fitting hole portion 15 on the arm portion side provided in the base portion 3 of the yoke 1, as shown in FIG. 2. The pair of first parallel surfaces are planes (section on 2—2) perpendicular to the axis, whose section is substantially elliptic having a pair of parallel sides. The provision of a substantially elliptical section facilitates the processing of the internal peripheral surface of the fixedly fitting hole portion 15. Of course, the internal peripheral surface of the fixedly fitting hole 15 on the arm portion side of the base portion 3 of the yoke 1 will suffice to have the pair of first parallel surfaces 15a, 15b, whose section is not particularly limited to an ellipse.

The tubular member 12 is fitted into the fixedly fitting hole 6 of the yoke, and a pair of second outer parallel surfaces 12a, 12b, which axially extend in positions opposed through 180 degrees and parallel to said first parallel surfaces 15a, 15b are formed in the external peripheral surface of the end on the yoke side of the tubular member. The second parallel surfaces 12a, 12b are formed by processing them into a substantially square in section in a plane (section on 2—2) perpendicular to the axis, by way of applying drawing or pressing to the external peripheral surface of the tubular member 12. Of course, it will suffice to form the second parallel surfaces 12a, 12b, whose section need not be limited to a square in section, but a separate member having the pair of second parallel surfaces 12a, 12b may be fitted in and secured to the outer peripheral surface of the end of the tubular member 12.

The first parallel surfaces 15a, 15b formed with the yoke 1 and the tubular member 12 in the fixedly fitting hole portion 15 of the base portion 3 of the yoke and the second parallel surfaces formed in the end on the yoke side of the tubular member 12 are opposed and fitted with a predetermined clearance c, and engagement between the first and second parallel surfaces 15a, 15b, and 12a, 12b constitutes the stopper portion 8.

In the elastic shaft coupling according to this embodiment, when a small torque of steering or the like is transmitted during the running of the automobile, a torque is transmitted between the tubular member 12 and the yoke 1 by the elastic force of the elastic member 7. When a large torque of steering or the like is transmitted during the stopping of the automobile, the elastic member 7 becomes elastically deformed so that the base portion 3 of the yoke and the tubular member relatively rotate by a predetermined spacing c between the first and second parallel surfaces 15a, 15b and 12a, 12b, and engagement between the first and second parallel surfaces 15a, 15b and 12a, 12b constitutes the stopper portion 8. From this time, the torque is transmitted between the tubular member 12 and the yoke 1 by the engagement between the tubular member 12 and the yoke 1.

Figure 3:
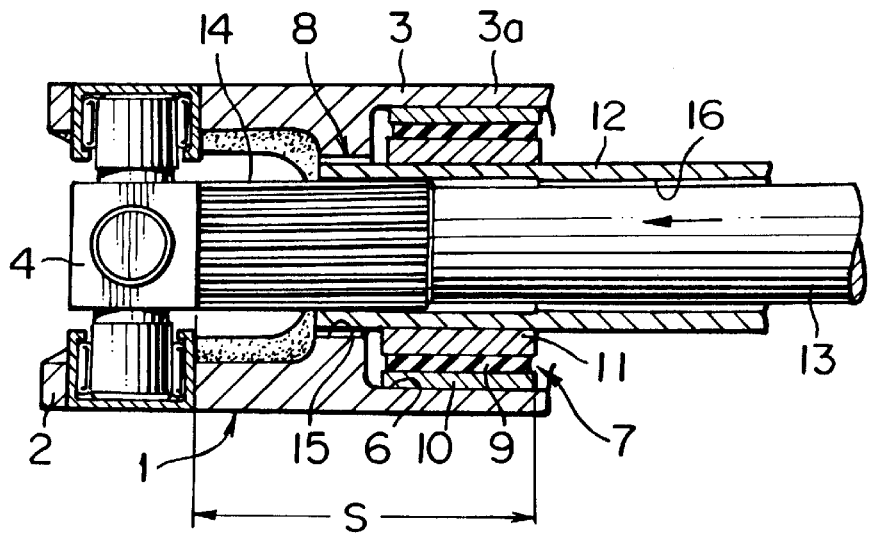
FIG. 3 is an operational view of a first embodiment of an elastic shaft coupling according to the present invention.

According to the above-described embodiment, since the elastic member 7 and the stopper portion 8 are separated in an axially parallel position, the elastic member is not processed as in prior art, thus enhancing the durability of the elastic member 7. In the case where the steering shaft 13 fitted in the tubular member 12 is provided with a shock absorbing mechanism, i.e., a collapse mechanism, when an automobile collides, as a moving stroke for contracting the full length of the steering shaft 13 in a direction as indicated by arrow, a large stroke amount of the distance S (FIG. 3) from the first fitting position to the cross shaft 4 is obtained, thus enhancing the shock absorbing performance.

Figure 4:
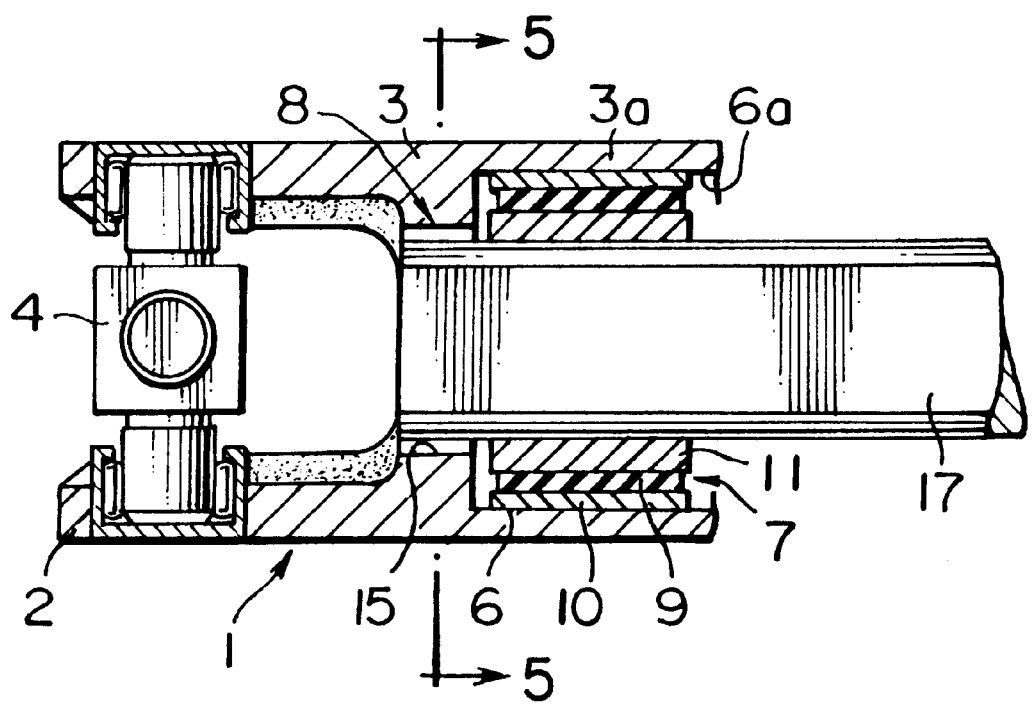
FIG. 4 is a sectional view of a second embodiment of an elastic shaft coupling according to the present invention.
Figure 5:
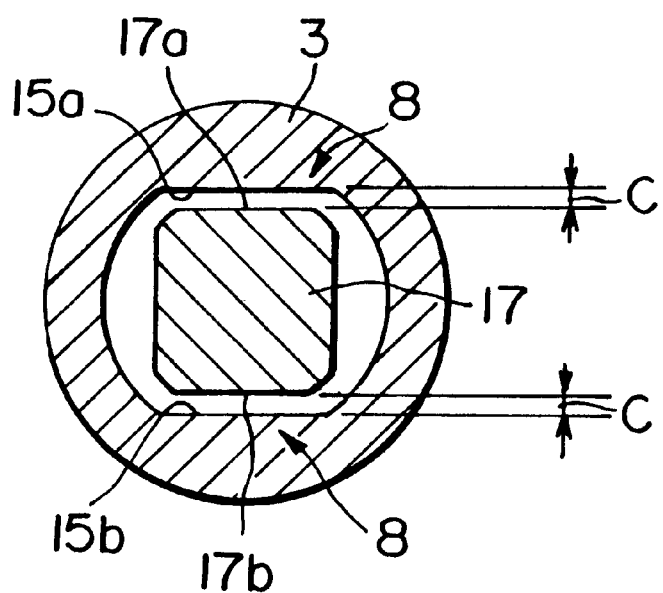
FIG. 5 is a sectional view taken on 5—5 of FIG. 4.

A second embodiment will be explained hereinafter with reference to FIG. 4. The same parts as those described in FIGS. 1 and 2 are indicated by the same reference numerals, explanation of which is omitted.

In place of the tubular member 12 shown in FIGS. 1 and 2, a shaft member 17 is directly fitted in the fixedly fitting hole 6 of the yoke 1, and the elastic member 7 is intervened between the fixedly fitting hole portion 6a of the end 3a of the base portion of the yoke 1 and the shaft member 17. The internal and external surfaces of the elastic member 7 are pressed in and secured to the fixedly fitting hole portion 6a of the yoke 1 and the shaft member 17. A pair of axially extending first parallel surfaces 15a, 15b are formed in positions opposed through 180 degrees of the internal peripheral surface of the fixedly fitting hole portion 15 on the side of the arm portion of the base portion 3 of the yoke 1. Further, a pair of second parallel surfaces 17a, 17b are formed which axially extend in positions opposed through 180 degrees of the outer peripheral surface of the base portion of the shaft member 17 and are parallel to the first parallel surfaces 15a, 15b. The yoke 1 and the shaft member 17 are fitted with the first parallel surfaces 15a, 15b of the base portion 3 of the yoke and the second parallel surfaces 17a, 17b of the shaft member 17 opposed with a predetermined clearance c, and the first and second parallel surfaces 15a, 15b and 17a, 17b constitute a stopper portion.

A pair of first parallel surfaces 15a, 15b extending to positions opposed through 180 degrees are formed in the internal peripheral surface of the fixedly fitting hole portion 15 on the side of the arm portion of the base portion 3 of the yoke 1, whose section in a plane (section on 5—5) perpendicular to the axis is substantially elliptic having a pair of parallel sides. The provision of a substantially elliptic section facilitates the processing of the internal peripheral surface of the fixedly fitting hole portion 15. However, the internal peripheral surface of the fixedly fitting hole portion 15 on the side of the arm portion of the base portion 3 of the yoke 1 will suffice to have a pair of first parallel surfaces 15a, 15b and is not particularly limited to an ellipse.

Further, the second parallel surfaces 17a, 17b in the end of the shaft member 17 on the side fitted in the yoke fixedly fitting hole portion 15 are formed by processing them into a substantially square in section in a plane (section on 5—5) perpendicular to the axis. Of course, since the second parallel surfaces 17a, 17b will suffice to be formed, the shape is not limited to a substantially square in section, but a separate member having a pair of second parallel surfaces 17a, 17b may be fitted and secured to the outer peripheral surface of the end of the shaft member 17.

We claim:

1. An elastic shaft coupling comprising:
a yoke having a first end, a second end, a yoke portion disposed on the first end, a first bore extending through the yoke portion for receiving a cross shaft, a base portion disposed on the second end, and a second bore extending through the base portion;
a tubular member having an outer peripheral surface disposed in the second bore of the yoke and having an open end for receiving a shaft member for relative axial movement within the tubular member;
an elastic member disposed between and connected to the outer peripheral surface of the tubular member and an inner peripheral surface of the second bore of the yoke; and
a stopper portion disposed between the yoke and the tubular member for preventing excessive relative rotational displacement therebetween, the stopper portion comprising a pair of parallel surface portions of the inner peripheral surface of the second bore of the yoke and a pair of outer parallel surface portions of the outer peripheral surface of the tubular member, the parallel surface portions of the second bore extending parallel to the outer parallel surface portions of the tubular member.

2. An elastic shaft coupling according to claim 1; wherein the inner peripheral surface of the second bore of the yoke having the parallel surface portions is generally elliptical-shaped.

3. An elastic shaft coupling according to claim 2; wherein the parallel surface portions of the second bore of the yoke are disposed opposite one another at 180 degrees; and wherein the outer parallel surfaces of the tubular member are disposed opposite one another at 180 degrees.

4. An elastic shaft coupling according to claim 2; wherein the generally elliptical-shaped inner peripheral surface of the second bore of the yoke has a pair of parallel surfaces extending at 180 degrees defining the parallel surface portions of the second bore of the yoke.

5. An elastic shaft coupling according to claim 1; wherein the parallel surface portions of the second bore of the yoke are disposed opposite one another at 180 degrees; and wherein the outer parallel surfaces of the tubular member are disposed opposite one another at 180 degrees.

6. An elastic shaft coupling according to claim 5; wherein the second bore of the yoke has a first diameter portion and a second diameter portion disposed between the first diameter portion and the first end of the yoke; and wherein the elastic member and the stopper portion are disposed in the first and second diameter portions, respectively.

7. An elastic shaft coupling according to claim 6; wherein the diameter of the first diameter portion of the second bore is greater than the diameter of the second diameter portion of the second bore.

8. An elastic shaft coupling according to claim 6; wherein the tubular member extends into the second diameter portion of the second bore.

9. An elastic shaft coupling according to claim 1; wherein the second bore of the yoke has a first diameter portion and a second diameter portion disposed between the first diameter portion and the first end of the yoke; and wherein the elastic member and the stopper portion are disposed in the first and second diameter portions, respectively.

10. An elastic shaft coupling according to claim 9; wherein the diameter of the first diameter portion of the second bore is greater than the diameter of the second diameter portion of the second bore.

11. An elastic shaft coupling comprising:
a yoke having a first end, a second end, a yoke portion disposed on the first end, a first bore extending through the yoke portion for receiving a cross shaft, a base portion disposed on the second end, and a second bore extending through the base portion;

a shaft member having an outer peripheral surface disposed in the second bore of the yoke;

an elastic member disposed between and connected to the outer peripheral surface of the shaft member and an inner peripheral surface of the second bore of the yoke; and a stopper portion disposed between the yoke and the shaft member for preventing excessive relative rotational displacement therebetween, the stopper portion comprising a pair of parallel surface portions of the inner peripheral surface of the second bore of the yoke and a pair of outer parallel surface portions of the outer peripheral surface of the shaft member, the parallel surface portions of the second bore extending parallel to the outer parallel surface portions of the shaft member.

12. An elastic shaft coupling according to claim 11; wherein the inner peripheral surface of the second bore of the yoke having the parallel surface portions is generally elliptical-shaped.

13. An elastic shaft coupling according to claim 12; wherein the parallel surface portions of the second bore of the yoke are disposed opposite one another at 180 degrees; and wherein the outer parallel surfaces of the shaft member are disposed opposite one another at 180 degrees.

14. An elastic shaft coupling according to claim 12; wherein the generally elliptical-shaped inner peripheral surface of the second bore of the yoke has a pair of parallel surfaces extending at 180 degrees defining the parallel surface portions of the second bore of the yoke.

15. An elastic shaft coupling according to claim 11; wherein the parallel surface portions of the second bore of the yoke are disposed opposite one another at 180 degrees; and wherein the outer parallel surfaces of the shaft member are disposed opposite one another at 180 degrees.

16. An elastic shaft coupling according to claim 15; wherein the second bore of the yoke has a first diameter portion and a second diameter portion disposed between the first diameter portion and the first end of the yoke; and wherein the elastic member and the stopper portion are disposed in the first and second diameter portions, respectively.

17. An elastic shaft coupling according to claim 16; wherein the diameter of the first diameter portion of the second bore is greater than the diameter of the second diameter portion of the second bore.

18. An elastic shaft coupling according to claim 16; wherein the shaft member extends into the second diameter portion of the second bore.

19. An elastic shaft coupling according to claim 11; wherein the second bore of the yoke has a first diameter portion and a second diameter portion disposed between the first diameter portion and the first end of the yoke; and wherein the elastic member and the stopper portion are disposed in the first and second diameter portions, respectively.

20. An elastic shaft coupling according to claim 19; wherein the diameter of the first diameter portion of the second bore is greater than the diameter of the second diameter portion of the second bore.

21. An elastic shaft coupling comprising:
a tubular housing having a first end, a second end, a first inner peripheral surface portion, and a second inner peripheral surface portion disposed between the second end and the first inner peripheral surface portion;

a shaft member having a terminal end disposed in the tubular housing, a first outer peripheral surface portion, and a second outer peripheral surface portion disposed at the terminal end in spaced-apart, confronting relation to the second inner peripheral surface portion of the tubular housing for contacting the second inner peripheral surface portion of the tubular housing to prevent excessive relative rotational displacement between the tubular housing and the shaft member; and an elastic member disposed between and connected to the first inner peripheral surface portion of the tubular housing and the first outer peripheral surface portion of the shaft member;

wherein the second inner peripheral surface portion of the tubular housing comprises a pair of first parallel surface portions; and wherein the second outer peripheral surface portion of the shaft member comprises a pair of second parallel surface portions each in confronting, spaced-apart parallel relation to one of the first parallel surface portions.

22. An elastic shaft coupling according to claim 21; wherein the second inner peripheral surface portion of the tubular housing is generally elliptical-shaped.

23. An elastic shaft coupling according to claim 21; wherein the first parallel surface portions of the tubular housing are disposed opposite one another at 180 degrees; and wherein the second parallel surface portions of the shaft member are disposed opposite one another at 180 degrees.

24. An elastic shaft coupling according to claim 21; wherein the second inner peripheral surface portion of the tubular housing is generally elliptical-shaped.

25. An elastic shaft coupling according to claim 21; wherein the shaft member comprises a tubular member having an open end disposed opposite the terminal end for receiving a shaft non-rotatably coupled to and axially slideable within the tubular member.

26. An elastic shaft coupling comprising:
a tubular housing having a first end, a second end, a first inner peripheral surface portion, and a second inner peripheral surface portion;

a shaft member having a terminal end disposed in the tubular housing, a first outer peripheral surface portion, and a second outer peripheral surface portion disposed at the terminal end;

an elastic member disposed between and connected to the first inner peripheral surface portion of the tubular housing and the first outer peripheral surface portion of the shaft member; and displacement preventing means disposed between the second inner peripheral surface portion of the tubular housing and the second outer peripheral surface portion of the shaft member for preventing excessive relative rotational displacement between the tubular housing and the shaft member;

wherein the displacement preventing means comprises a pair of first parallel surface portions of the second inner peripheral surface portion of the tubular housing, and pair of second parallel surface portions of the second outer peripheral surface portion of the shaft member each in confronting, spaced-apart parallel relation to one of the first parallel surface portions.

27. An elastic shaft coupling according to claim 26; wherein the first parallel surface portions of the tubular housing are disposed opposite one another at 180 degrees; and wherein the second parallel surface portions of the shaft member are disposed opposite one another at 180 degrees.

28. An elastic shaft coupling according to claim 26; wherein the second inner peripheral surface portion of the tubular housing is generally elliptical-shaped.

29. An elastic shaft coupling according to claim 26; wherein the shaft member comprises a tubular member having an open end disposed opposite the terminal end for receiving a shaft non-rotatably coupled to and axially slideable within the tubular member.

* * * * *